United States Patent [19]

Shindelar et al.

[11] 4,249,572
[45] Feb. 10, 1981

[54] SELF-RELIEVING FLUID COUPLING

[76] Inventors: Aloysius C. Shindelar, Hudson, Iowa;
Deere & Company, 02, Moline, Ill.

[21] Appl. No.: 118,267

[22] Filed: Feb. 4, 1980

Related U.S. Application Data

[63] Continuation of Ser. No. 927,462, Jul. 24, 1978.

[51] Int. Cl.³ .................... F16L 37/00; F16K 51/00
[52] U.S. Cl. .................... 137/614.04; 137/614.05;
137/627.5; 137/596.1; 251/149.6
[58] Field of Search ............ 137/614, 614.03, 614.04,
137/614.05, 596.1, 627.5; 251/149, 149.6, 149.8

[56] References Cited

U.S. PATENT DOCUMENTS

| | | | |
|---|---|---|---|
| 2,184,413 | 12/1939 | Della Chiesa et al. | 137/596.1 |
| 2,670,751 | 3/1954 | Wilson | 137/596.1 |
| 2,735,696 | 2/1956 | Omon et al. | 137/614.05 |
| 3,036,595 | 5/1962 | Rogers | 251/149.6 |
| 3,049,148 | 8/1962 | Richardson | 251/149.6 |
| 3,130,749 | 4/1964 | Wittren | 137/614 |
| 3,211,178 | 10/1965 | Kiszko | 137/614.04 |
| 3,213,884 | 10/1965 | Moyer et al. | 137/614.03 |

Primary Examiner—Martin P. Schwadron
Assistant Examiner—A. Michael Chambers

[57] ABSTRACT

A high pressure hydraulic female coupled for mating with a check ball equipped male coupling includes a receptacle having an engagement bore at one end connected to the main bore at the other end. A plug is disposed in the main bore carrying a main poppet valve which is spring loaded so as to block the main bore from the engagement bore and carrying a secondary poppet valve having a portion engaging a stem on the main poppet valve and biased away therefrom to a position blocking the main bore from a secondary port connected to a fluid reservoir. The main poppet valve is equipped with a retaining pin which is slidable in a slot provided in the secondary poppet valve to limit movement therebetween so as to allow the secondary poppet valve to be in its blocking position when the main poppet valve is opened by the check ball of the male coupling abutting a poppet stem on the main poppet valve and causing the secondary poppet valve to open when the main poppet valve moves to its blocking position.

4 Claims, 1 Drawing Figure

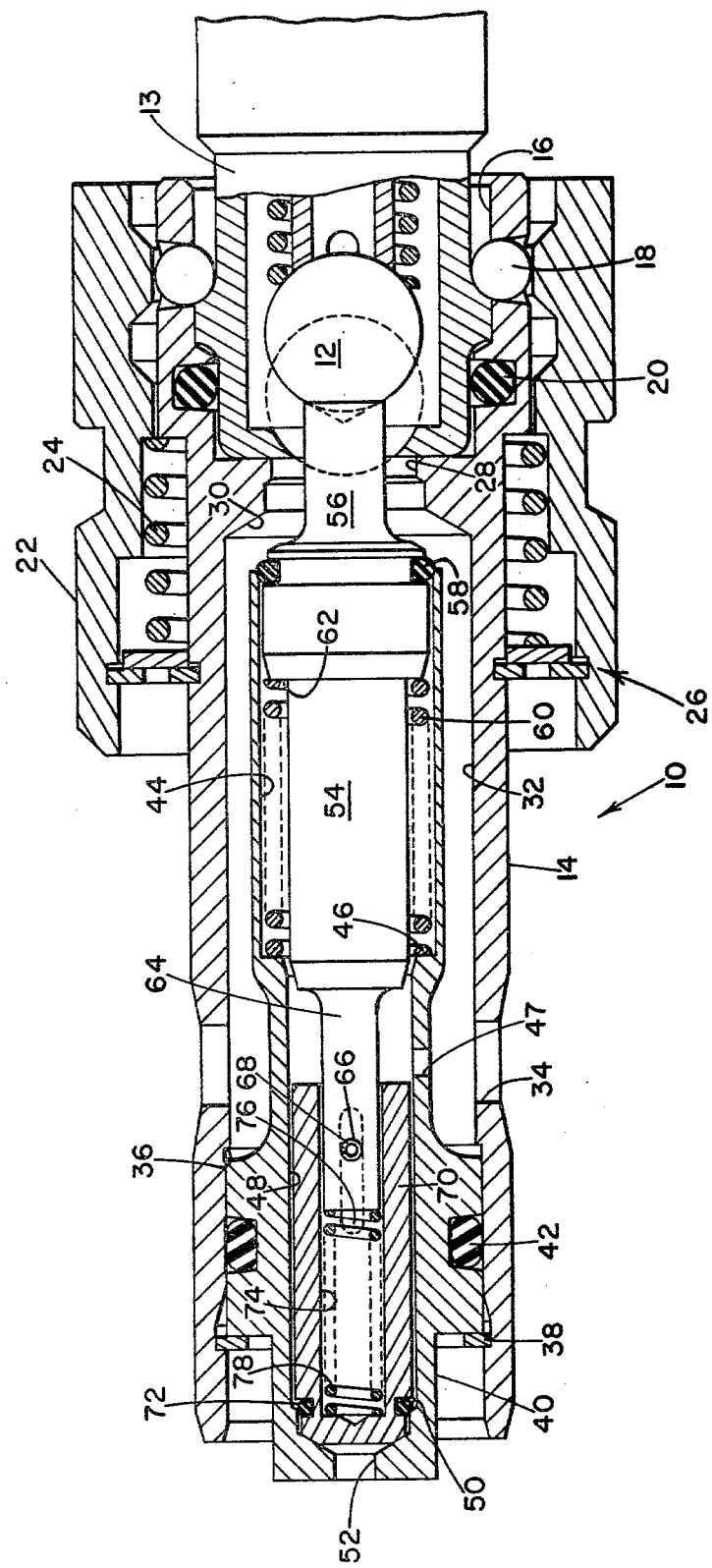

SELF-RELIEVING FLUID COUPLING

This is a continuation of application Ser. No. 927,462, filed July 24, 1978.

BACKGROUND OF THE INVENTION

The present invention relates generally to high pressure hydraulic couplings and more particularly to a female coupler which automatically relieves any pressure build-up in the coupler after the male coupler is disengaged.

In the past, numerous designs of couplers have been developed which were intended for coupling with both the male and female couplers pressurized. In all these designs, it was necessary either to require special spring biasing or to require successive depressurization and pressurization of one of the couplers in order to complete the fluid connection.

SUMMARY OF THE INVENTION

The present invention provides a female coupler which uses a secondary poppet valve for reducing the female coupler pressure to zero when the main poppet valve is closed and the coupler is in a disconnected state. This allows the female coupler to be easily coupled with either a pressurized or unpressurized male connector.

The above and additional advantages of the present invention will become apparent to those skilled in the art from a reading of the following detailed description when taken in conjunction with the accompanying drawings.

BRIEF DESCRIPTION OF THE DRAWING

The drawing shows a sectional view of the female coupler of the present invention.

DESCRIPTION OF THE PREFERRED EMBODIMENT

Referring now to the drawing, therein is shown a high pressure female coupler 10. For purposes of convenience and not by way of limitation, the viewer's right will be taken as the right-hand side of the female coupler 10. A ball 12 shown in the right-hand side of the female coupler 10 represents the check ball of a conventional commercially available male coupler 13, a portion of which is shown.

The female coupler 10 consists of a receptacle 14 having an engagement bore 16 at the right end. Engagement balls 18 and an O-ring 20 are positioned around the periphery of the engagement bore 16 to engage and hold the male coupling. The engagement balls 18 are forced into engagement by a sleeve 22 urged by a sleeve spring 24 which abuts a snap ring assembly 26 positioned around the receptacle 14.

The engagement bore 16 is connected by an opening 28 to a main valve seat 30 which opens into a main bore 32. The main bore 32 is connected by a plurality of main ports 34 to a fluid passage which encircles the receptacle 14 and which is connectible alternatively to a source of hydraulic fluid pressure and a fluid reservoir (not shown).

Around the inner periphery of the main bore 32 in the receptacle 14 is a shoulder 36 and a snap ring 38 which secures a plug 40 in the receptacle 14.

The portion of the plug between the shoulder 36 and the snap ring 38 includes an O-ring 42 which prevents leakage between the plug 40 and the receptacle 14.

In the right-hand end of the plug 40 is a poppet bore 44 which terminates in a shoulder 46. To the left of the shoulder 46 is a secondary bore 48 which terminates at its left-hand end in a secondary valve seat 50. The secondary valve seat 50 is connected to a secondary port 52 which may be connected to a hydraulic fluid utilizing device but in the preferred embodiment is connected to a fluid reservoir (not shown).

A main poppet valve 54 is disposed in the poppet bore 44. The main poppet valve 54 includes a poppet stem 56 which extends through the opening 28 in the receptacle 14 so as to be capable of abutting the ball 12 as the male coupler is inserted. To the left of the poppet stem 56 is a main seal 58 which encircles the main poppet valve 54. The main seal 58 is capable of sealing against the main valve seat 30 under the urging of a spring 60 which is disposed between the shoulder 46 in the plug 40 and a shoulder 62 on the main poppet valve 54.

The main poppet valve 54 is provided with a pin stem 64 which extends leftwardly therefrom. The pin stem 64 contains a pin hole 66 into which a roll pin 68 is inserted.

A secondary poppet valve 70 is slidably positioned in the secondary bore 48 and is encircled by a secondary seal 72 which is movable to seal against the secondary valve seat 50. The secondary poppet valve 70 contains a stem bore 74 into which the pin stem 64 of the main poppet valve 54 is inserted. A pair of slots 76 in the wall of the secondary poppet valve 70 engage the roll pin 68 and are of a predetermined length to limit movement between the main poppet valve 54 and the secondary poppet valve 70.

A secondary spring 78 is disposed between the closed end of the stem bore 74 and the pin stem 64 so as to urge the main poppet valve 54 away from the secondary poppet valve 70 to the limit of roll pin 68 movement in the slots 76.

A plug port 47 is provided in the plug 40 fluidly connecting the main bore 32 and the secondary bore 48.

While the drawing shows the connected full flow position, in the unconnected position, the main poppet valve 54 will be in its rightmost position with the main seal 58 sealing against the main valve seat 30 under loading of the main spring 60.

With the main poppet valve 54 in its rightmost position, the roll pin 68 will engage the left end of the slots 76 so as to move the secondary poppet valve 70 slightly to the right to unseat the secondary seal 72 from the secondary valve seat 50 and connect the main port 32 through the plug bore 47 and the space between the secondary bore 48 and the secondary poppet valve 70 to the secondary port 52 and thence to the reservoir. This means that there is zero pressure throughout the entire female coupler 10.

As the male coupler is inserted in the engagement bore 16 of the female coupler 10, the ball 12 will abut the poppet stem 56.

Under the worst condition where the male coupling is pressurized, the ball check of which the ball 12 is a part will not open and thus the engagement of the male coupler will force the main poppet valve 54 to the left.

The first movement of the main poppet valve 54 will allow the secondary poppet valve 70 to also move leftward causing the secondary seal 72 to seat against the secondary valve seat 50 to block the secondary bore 48 from the secondary port 52.

As the ball 12 is moved to its phantom line position in the engagement bore 16, the roll pin 68 will move leftwardly in the slots 76. Pressurization of the fluid passage encircling the receptacle 14 coupled with spring forces of compressed springs 60 and 78 will force the main poppet 54 to the right, moving the check ball 12 from the phantom line position to the solid line position opening a through passage between female and male couplers 10 and 13. The springs 60 and 78 together provide a force to the right greater than the spring of the male coupler 13 and maintain an open through passage between female and male couplers during full flow operation.

The full flow position is as shown in the drawing with the ball 12 clear of the male coupler, the main seal clear of the main valve seat 30 and the secondary seal 72 sealing against the secondary valve seat 50. As would be evident to those skilled in the art, only a minimal engagement pressure is required between the male and female coupler 10 and that engagement will be held by the engagement balls 18 held in place against mating portions of the male coupler by the sleeve 22 so as to permit full flow from the male coupler through the main bore 32 and out the main ports 34 to the hydraulic fluid utilizing devices.

The male coupler 13 is disconnected from the female coupler 10 by pulling on the male coupler causing both female and male couplers 10 and 13 to move to the right allowing outward movement of the engagement balls 18 and withdrawal of the male coupler 13. The female coupler 10 will return to the central position due to the urging of spring 24. As the male coupler 13 is removed, the main poppet valve 54 moves to the right until the main seal 58 abuts the main valve seat 30. The movement of the main poppet valve 54 causes the roll pin 68 to abut the slots 76 to move the secondary poppet valve 70 to the right so as to move the secondary seal 72 out of contact with the secondary valve seat 50. Thus, when the main bore 32 is blocked from the engagement bore 16, pressure in the main bore 32 will automatically be relieved through the plug port 47, the clearance between the secondary bore 48 and the secondary poppet valve 70, and through the secondary port 52.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. A female coupler for coupling and uncoupling to and from a longitudinally extending male coupler having a longitudinal through passage provided therein and a check member disposed in the through passage for limited movement between closed and open positions to respectively block and unblock the through passage, comprising: a receptacle member having an engagement bore provided therein for receiving the male coupler, said receptacle member having a main bore provided therein connected to the engagement bore, said receptacle member having main and secondary ports provided therein connected to the main bore, a main poppet valve movably disposed in the main bore, biasing means yieldably urging the main poppet valve to a normal closed position blocking the main bore from the engagement bore, the main poppet valve having a stem projecting into the engagement bore for engagement with and movement by the check member of the male coupler as the male coupler is inserted into the engagement bore with sufficient force to overcome the main poppet valve biasing means, whereby said main poppet valve is moved by the check member to an open position when the male coupler is inserted into the engagement bore, a secondary poppet valve movably disposed in the main bore, means within the main bore biasing the secondary poppet valve to a closed position blocking the main bore from the secondary port when said couplers are coupled, and means connecting the secondary poppet valve to the main poppet valve for moving said secondary poppet valve towards an open position unblocking the main bore from the secondary port as the main poppet valve moves to the closed position.

2. A fluid coupling comprising: a male coupler having a through passage with a check valve seat provided therein; check valve means disposed in the through passage of the male coupler and biased to seat against the check valve seat to block fluid flow from the through passage; a female coupler having a through passage provided therein having a fluid reservoir connectible end and a male coupler connectible end, said female coupler having a main valve seat provided in the through passage proximate the male coupler connectible end and a secondary valve seat in the through passage proximate the fluid reservoir connectible end, said female coupler having a pressurized fluid connectible port provided therein connected to the through passage; main poppet means movably disposed in the female coupler through passage for movement between seated and unseated positions with respect to the main valve seat, means yieldably biasing the main poppet means to the seated position, said main poppet means including stem means abuttable by the check valve means upon connection of the male coupler to the male coupler connectible end of the female coupler to unseat the main poppet means from the main valve seat; secondary poppet means movably disposed in the female coupler through passage for movement between seated and unseated positions with respect to the secondary valve seat, means yieldably biasing the secondary poppet means to the seated position, and engagement means interconnecting the main and secondary poppet means responsive to the seating and unseating of the main poppet means against the main valve seat to respectively unseat and seat the secondary poppet means against the secondary valve seat.

3. A female coupler connectible to a source of pressurized hydraulic fluid and a hydraulic reservoir for coupling and uncoupling to and from a longitudinally extending male coupler having a longitudinal through passage provided therein with a check member disposed in the through passage spring biased to block flow of pressurized fluid therethrough, comprising: a longitudinally extending receptacle member having first and second ends, said first end having a longitudinally extending engagement bore provided therein for receiving said male coupler and said second end having a longitudinally extending main bore connected to the engagement bore, a main valve seat disposed between the main and engagement bores, the main bore having a main port connectible to the source of pressurized hydraulic fluid; a longitudinally extending plug member having first and second ends respectively proximate and distal from the main valve seat positioned in and sealingly engaging the main bore between the second end of said receptacle member and the main port, said plug member having a stepped bore provided therein with a larger diameter portion thereof in the first end open to the main valve seat and a smaller diameter portion thereof in the second end connected to the main bore, said plug member having a secondary port connected to the smaller diameter portion of the stepped bore connectible to the hydraulic reservoir, a secondary valve seat disposed between the secondary port and stepped bore; a longitudinally extending main poppet valve slidably disposed in the large diameter portion of the stepped bore and having first and second ends respectively proximate and distal from the engagement bore, said first end including a poppet stem extending through the main valve seat into the engagement bore and said second end including a pin stem having a pin hole provided therein; main seal means encircling the main poppet valve proximate the poppet stem sealable against the main valve seat to block the flow of pressurized fluid between the engagement bore and the main bore; a main spring disposed in the large diameter portion of the stepped bore urging the main poppet valve towards the engagement bore to seal the main seal means against the main valve seat; a longitudinally extending secondary poppet valve slidably disposed in the small diameter portion of the stepped bore and having first and second ends respectively proximate and distal from the main poppet valve, said first end of said secondary poppet valve having a stem bore provided therein encircling the pin stem and having a longitudinally extending slot provided therein of a predetermined length and having first end proximate and distal ends; secondary seal means encircling the secondary poppet valve proximate the second end of the secondary poppet valve sealable against the secondary valve seat to block the flow of pressurized fluid from the stepped bore to the secondary port; a secondary spring disposed in the stem bore abutting the main poppet valve for urging the secondary poppet valve away from the main poppet valve; and pin means inserted in the pin hole of the main poppet valve and extending therefrom to engage the slot in the secondary poppet valve, said pin means abutting the first end proximate end of the slot when the main seal means seals against the main valve seat and sliding between the first end proximate and distal ends of the slot when the secondary seal means seals against the secondary valve seat.

4. A female coupler for coupling and uncoupling to and from a longitudinally extending male coupler having a longitudinal through passage provided therein and a check member disposed in the through passage movable between closed and open positions to respectively block and unblock the through passage, comprising: a receptacle member having an engagement bore provided therein for receiving the male coupler, said receptacle member having a main bore provided therein connected to the engagement bore, a main valve seat disposed between the engagement and main bores, said receptacle member having a main port connected to the main bore; a plug member disposed in and secured to the receptacle member main bore, said plug member having bore means provided therein open to the main bore, said plug member having a secondary port provided therein connected to the bore means a secondary valve seat disposed between the secondary port and the bore means; longitudinally extending main poppet valve means slidably disposed in the bore means of the plug member and having first and second ends including a stem on the first end extending longitudinally into the main bore; main seal means disposed about the main poppet valve between the stem and second end thereof movable into and out of sealing engagement with the main valve seat for sealing the main bore from the engagement bore; main biasing means disposed in the bore means for urging the main poppet valve means toward the main valve seat for the mating of the main seal means therewith; secondary poppet valve means slidably disposed in the bore means of the plug member between said main poppet valve means and said secondary port; said secondary poppet valve means including first engagement means provided therein proximate said main poppet valve; secondary seal means disposed about said secondary poppet valve means movable into and out of sealing engagement with the secondary valve seat for sealing the main bore from the secondary port; secondary biasing means disposed between said main and secondary poppet valve means urging said secondary poppet valve means away from said main poppet valve means and towards the secondary valve seat; second engagement means provided in said main poppet valve means engaging said first engagement means for moving said secondary seal means out of contact with said secondary valve seat when said main seal means is in contact with said main valve seat and to allow said secondary biasing means to move said secondary seal means into contact with said secondary valve seat when said main seal means is out of contact with said main valve seat.

* * * * *

UNITED STATES PATENT OFFICE
CERTIFICATE OF CORRECTION

Patent No. 4,249,572          Dated  10 February 1981

Inventor(s)  Aloysius C. Shindelar

It is certified that error appears in the above-identified patent and that said Letters Patent are hereby corrected as shown below:

Page 1, at [73] insert -- Assignee: Deere & Company, Moline, IL --.

Signed and Sealed this

Twelfth Day of May 1981

[SEAL]

Attest:

RENE D. TEGTMEYER

Attesting Officer      Acting Commissioner of Patents and Trademarks